United States Patent [19]

Okubo

[11] 4,355,541
[45] Oct. 26, 1982

[54] MAGNETIC GYROSCOPE

[75] Inventor: Shigeo Okubo, Menlo Park, Calif.

[73] Assignee: Design Professionals Financial Corp., Monterey, Calif.

[21] Appl. No.: 189,545

[22] Filed: Sep. 22, 1980

[51] Int. Cl.³ .............................................. G01C 19/28
[52] U.S. Cl. ..................................... 74/5.6 E; 73/504
[58] Field of Search ............... 74/5.6 E; 73/505, 504, 73/519; 324/207

[56] References Cited

U.S. PATENT DOCUMENTS

| | | | |
|---|---|---|---|
| 3,323,377 | 6/1967 | Fraiser et al. | 73/504 X |
| 3,702,569 | 11/1972 | Quinn et al. | 74/5.7 X |
| 3,875,545 | 4/1975 | Curtiss | 324/207 X |
| 4,095,477 | 6/1978 | Morris et al. | 74/5.6 D |
| 4,147,063 | 4/1979 | Bower et al. | 73/505 X |
| 4,297,883 | 11/1981 | Shannon | 74/5.6 E X |
| 4,299,127 | 11/1981 | Shannon | 73/504 |
| 4,314,202 | 2/1982 | Okubo | 324/207 |

Primary Examiner—Rodney H. Bonck
Attorney, Agent, or Firm—Townsend and Townsend

[57] ABSTRACT

A magnetic gyroscope includes a flexible rotating disk having a plurality of magnetic regions formed in or on the periphery of the disk. Typically four pairs of magnetic sensors are disposed about the disk at 90° angles with respect to each other to detect the magnetic regions as the disk rotates, each sensor pair including a sensor above the disk and one below it. The sensors detect changes in the separation of the disk from the sensors and supply this information to an amplifier to control the gyroscope or the structure within which the gyroscope is mounted.

14 Claims, 7 Drawing Figures

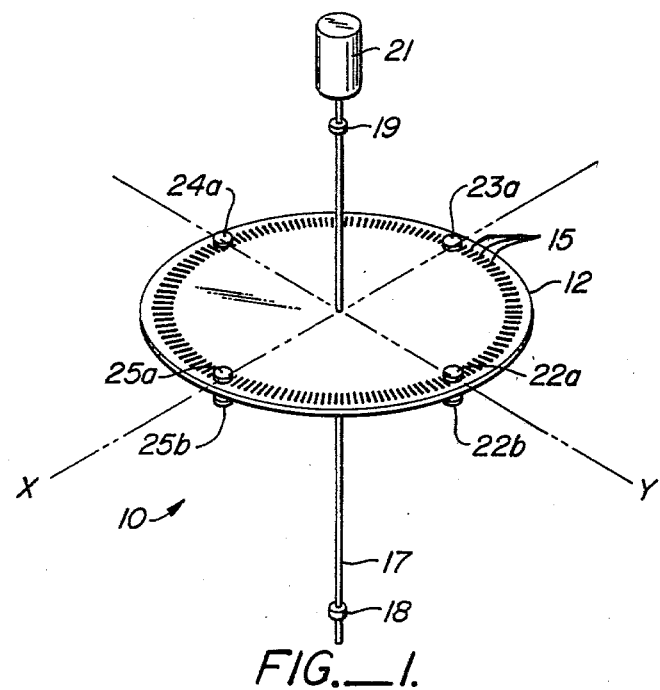
FIG.—1.
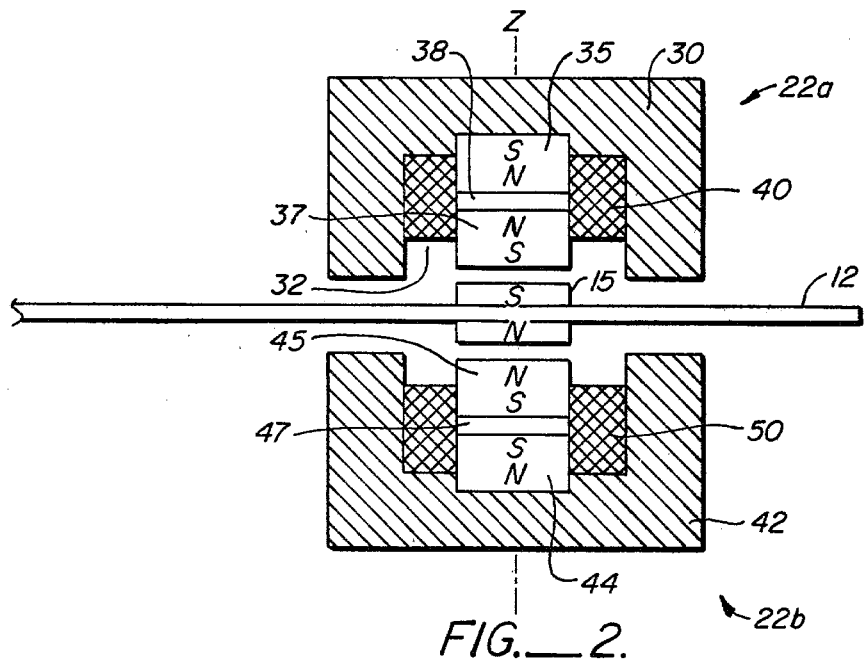
FIG.—2.
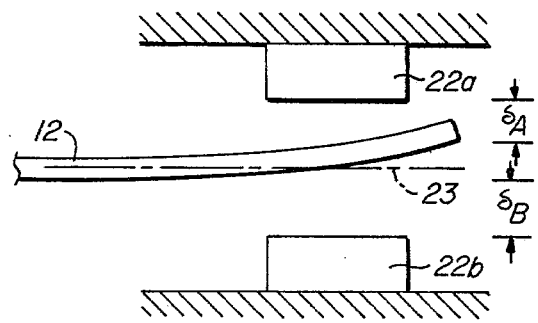
FIG.—3.

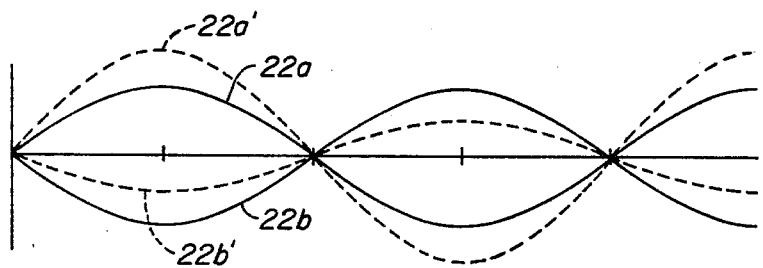
FIG._4a.
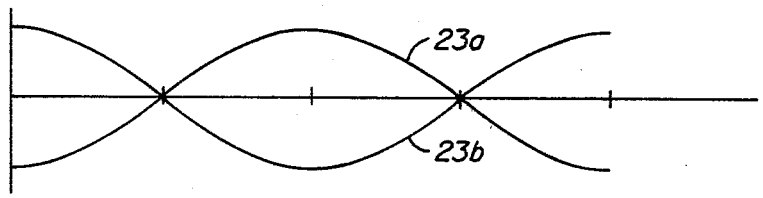
FIG._4b.
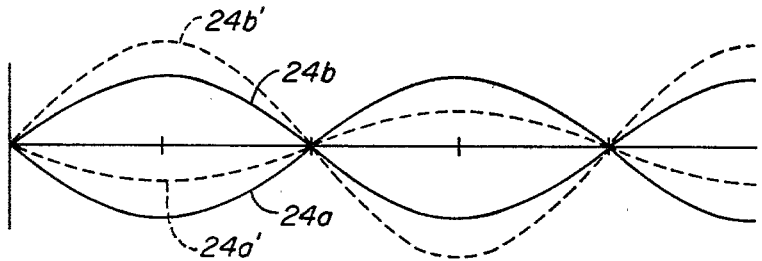
FIG._4c.
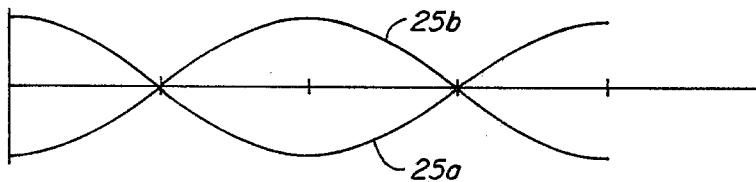
FIG._4d.

MAGNETIC GYROSCOPE

BACKGROUND OF THE INVENTION

1. Field of the Invention

This invention relates to gyroscopes, and in particular to a gyroscope which includes a series of magnetic regions formed on or in the rotating member and to one or more sensors disposed around the gyroscope to detect changes in the distance between the rotating magnetic regions and the sensor to thereby detect rates applied to the gyroscope.

2. Prior Art

Gyroscopes are well known control and measurement devices. Prior art gyroscopes, however, typically have been electrically or mechanically controlled. Gyroscopes also are known which use capacitive effects and a stiff rotating plate. Unfortunately such gyroscopes generate only small signals and require a constant voltage supply for the capacitor plate. Further, existing gyroscopes have not included any simple technique for determining the position of the rotor with respect to the support at any given time.

Many prior art gyroscopes also suffer from the disadvantage that their sensors depend upon relative motion between moving parts. Such sensors consequently possess inherent mechanical resonances which must be considered in the initial design or use of the output signal. Other prior art gyroscopes require a continuous supply of electric power for the sensors, unnecessarily increasing the complexity of such devices. Other gyroscopes' positional sensors are directional in nature and require careful installation to properly align the axis of maximum sensitivity with respect to the desired motion of the gyroscope. Still other sensors are temperature sensitive, relatively complicated to construct or calibrate, or difficult to mount in a proper position to monitor the motion of the gyroscope.

SUMMARY OF THE INVENTION

The magnetically controlled gyroscope of this invention overcomes the previously mentioned disadvantages of prior art gyroscopes. In particular, the magnetic gyroscope of this invention includes a member having an axis of rotation, a drive means for rotating the member about its axis of rotation, and a plurality of magnetic regions formed on the surface of the member. At least one sensing means is positioned in proximity to the rotating member for detecting any change in the distance separating the at least one sensing means and each of the plurality of magnetic regions as each passes the at least one sensing means. The sensing means generates an output signal in relation to any change in the separation distance.

In one embodiment of the magnetic gyroscope, the rotating member is a flexible disk containing a large number of separately magnetized regions, and eight sensors are positioned about the rotating disk. Four of the sensors are disposed in a plane parallel to the upper surface of the disk and at 90° angles from each other, and the other four sensors being disposed in a plane parallel to the lower surface of the disk at 90° angles with each other. A torque applied to the disk about any axis except the axis of rotation causes the disk to flex and changes the separation distance between the magnetized regions and the sensors at particular positions around the disk related to the direction of the applied torque. The change in separation distance causes a change in the current generated in some of the coils of the individual sensors which current is supplied to an appropriate external measuring instrument, for example, a differential amplifier. The magnitude of the change in current is indicative of the rates applied to the gyroscope.

The sensors which control the magnetic gyroscope operate without an external power supply. In addition, if the sensors are mounted to repel the magnetic regions on the disk, the sensors act as a magnetic levitation device to eliminate any contact between the disk and the sensors. Because all sensors are mounted on the structure supporting the gyroscope, the magnetic gyroscope of this invention eliminates any electrical connections between the rotating member and external measuring equipment.

BRIEF DESCRIPTION OF THE DRAWINGS

FIG. 1 is a perspective view of one embodiment of the magnetic gyroscope.

FIG. 2 is a cross-sectional view of a pair of sensors positioned to detect movement of the rotating member of the gyroscope.

FIG. 3 is a schematic representation showing the effect of a rates applied to the gyroscope when the gyroscope is fabricated utilizing a flexible member.

FIGS. 4A-4D are timing diagrams showing the output signals from the sensors of one embodiment of the invention.

DETAILED DESCRIPTION

A perspective view of one embodiment 10 of the magnetically controlled gyroscope of this invention is shown in FIG. 1. As shown, a disk 12 containing a plurality of magnetic regions 15 is mounted to rotate about an axis 17. In the preferred embodiment of the invention, disk 12 is flexible and therefore will bend if a torque is applied to it in any direction other than about its axis of rotation 17. In the embodiment shown in FIG. 1, disk 12 is rotated by a shaft 17, mounted between bearings 18 and 19 and driven by motor 21. A plurality of sensors 22a, 22b, 23a, 24a, 25a, and 25b are disposed about disk 12 to detect magnetic regions 15. For the embodiment shown, sensors 22-25 are mounted on the structure (not shown) which supports gyroscope 10.

Sensors 22a, 23a, 24a, and 25a mounted above disk 12 are mounted in a plane parallel to the plane of disk 12 and individually spaced 90 degrees apart. Four additional sensors 22b, 23b (not shown), 24b (not shown), and 25b are mounted in another plane parallel to disk 12 and beneath it. Sensors 23b and 24b are mounted beneath disk 12 directly opposite sensors 23a and 24a, respectively. Magnetic regions 15 are disposed about the periphery of disk 12. Regions 15 may be magnetized portions of magnetic tape, discretely magnetized objects such as magnets, or other well known magnetized domains. Regions 15 need only disrupt the field near a sensor to be detected. Although a fixed number of magnetic regions 15 are shown in FIG. 1, any desired number of such regions may be created in or on the disk 12. The number depicted in FIG. 1 is merely for illustrative purposes. Similarly, although eight sensors are shown in FIG. 1, a greater or lesser number may be used depending upon the desired use of gyroscope 10.

In the preferred embodiment, motor 21 will drive disk 12 at a constant speed. A torque applied to gyroscope 10 about either the x axis or y axis will generate an output signal from two pairs of sensors in a manner described below.

One method of constructing the sensors 22–25 is shown in FIG. 2. Sensors 22a and 22b operate in the same manner and have corresponding elements. For simplicity, only sensor 22a will be described herein, and it should be understood that all other sensors shown in FIG. 1 operate using the same principle. Sensor 22a includes a housing 30, typically symmetrical about the z axis shown in FIG. 2. A recess, generally designated by reference numeral 32, is formed within housing 30. Housing 30 may be fabricated from any easily magnetizable material, for example, soft iron. Secured to the inner portion of the recess 32 within housing 30 are a pair of permanent magnets 35 and 37. Spacing material 38, typically fabricated from soft iron or other magnetizable material separates magnet 35 from magnet 37. Magnets 35 and 37 are placed within housing 30 in mutually opposing magnetic relationship, that is, attempting to repel each other. A coil 40 is formed around magnets 35 and 37 and spacer 38.

Upper magnet 35 produces a generally toroidal upper magnetic field which extends from the upper (south) pole face outwardly and downwardly through housing 30 and radially inward through coil 40 to the lower (north) pole face of magnet 35. Similarly, lower magnet 37 produces a generally toroidal magnetic field extending downwardly from its lower (south) pole face, then radially outward into housing 30, then upwardly through the side wall portions of housing 30, and radially inward through coil 40 to the upper (north) face of magnet 37.

In use, the reluctance of the magnetic path through magnet 37 will vary depending upon the proximity of region 15 to magnet 37. This variance causes the strength of the magnetic field passing through coil 40 from below to vary, thereby resulting in the generation of an electrical current which is directly proportional to the rate of change of distance with time between magnet 37 and region 15. The signals from coil 40 appear on external leads (not shown) and are coupled to a suitable measuring instrument (not shown). The manner of operation of sensor 22a is described in further detail in my co-pending U.S. patent application entitled Flexural Vibration Sensor, filed Nov. 24, 1978, and given Ser. No. 963,476, now U.S. Pat. No. 4,314,202, issued Feb. 2, 1982. Sensors 22–25 can be any type of sensor capable of detecting the passing magnetic regions 15. For example, in other embodiments sensors 22–25 are phonograph pick-ups.

The lower sensor 22b also includes a housing 42, magnets 44 and 45, a magnetizable intervening spacer 47 and a coil 50. Sensor 22b operates in the same manner as described with respect to sensor 22a, however, each of the magnets in sensor 22b has been inverted with respect to those described in sensor 22a. This inversion allows the upper (north) face of magnet 45 to repel the north portion of magnetic region 15 on disk 12. The combined repulsive forces between magnets 37 and 45 and magnetic region 15 acts to center disk 12 between sensor 22a and 22b.

The effect of a torque applied about either the x- or y-axis of the gyroscope 10 may be more clearly understood with regard to FIG. 3. Shown schematically in FIG. 3 are sensors 22a and 22b and disk 12 rotating between them. When disk 12 is fabricated from flexible material, a counterclockwise torque applied about the y-axis of gyroscope 10 will deform disk 12 as shown in FIG. 3. The counterclockwise torque effectively changes the spacing between magnetic regions 15 and each of magnets 37 and 45. The spacing between region 15 and magnet 37 will be reduced to δa while the spacing between region 15 and magnet 45 will be increased to δb. The change in spacing will change the strength of the magnetic fields flowing through magnets 37 and 45 thereby changing the current generated by coils 40 and 50, respectively. This change in current may be detected by an external measuring instrument and correlated to the torque applied.

The output signals from the coils of the various sensors 22–25 are shown in FIG. 4. The output signals from sensor pair 22 are shown in FIG. 4A, from sensor pair 23 in FIG. 4B, from sensor pair 24 in FIG. 4C and from sensor pair 25 in FIG. 4D. FIGS. 4A–4D show the output signals from the various sensors when no torque is being applied about either the x or the y axis of gyroscope 10. Application of a torque about either axis will modulate the amplitude of the output signals by changing the strength of the magnetic field passing through the coil of each of the sensors affected by the torque. For example, the counterclockwise torque about the y-axis discussed in conjunction with FIG. 3 will increase the amplitude of the signals from sensors 22a and 24b and will decrease the amplitude of the signals from sensors 22b and 24a. Dashed lines in FIGS. 4a and 4c show this effect. The amplitude of the output signals will be proportional to the angular rate about the input axis. The frequency of the output signal will depend upon the rotation rate of disk 12 and the spacing of regions 15. Increased sensitivity may be achieved by making disk 12 more flexible, for example, by making it thinner.

The opposed polarity mounting of the magnets in the sensors with respect to the magnetized regions 15 on disk 12 act as a magnetic levitation device to prevent physical contact between disk 12 and sensors 22–25. By using pairs of sensors at each location a linear output signal will result if each pair of sensors is connected to an operational amplifier of differential input type. Suitable commercially available amplifiers are the Burr Brown 3660 and 3670. The output signal from the operational amplifier will occur only when a torque is present. Well known rate table techniques may be used to calibrate the magnetic gyroscope.

Although the foregoing describes one embodiment of the invention, it should be understood that numerous variations may exist within particular embodiments of the invention without departing from the scope of the invention, which is set forth in the appended claims. For example, in some embodiments of the invention, the rotating member 12 may be differently shaped and the magnetic regions 15 formed by a different technique. The disk 12 may be driven by other means, for example, hydraulic or compressed air. The sensors 22–25 may be of different form, for example, electromagnets may be used rather than permanent magnets.

What is claimed is:

1. A magnetic gyroscope comprising:
   a member having an axis of rotation;
   driving means for rotating the member about its axis of rotation;
   a plurality of magnetic regions on the member; and at least one sensing means positioned in proximity to the member for detecting changes in the distance between at least one sensing means and each of the plurality of magnetic regions as each region passes the at least one sensing means, the at least one sensing means generating an output signal in relation to any change in said distance;

the at least one sensing means including a cylindrical housing for providing an internal magnetic path, electrically conductive cylindrical coil means within the housing, said coil means and said housing having a common axis of symmetry, and means for generating a magnetic field within the internal magnetic path through the coil means and in a region exterior to the housing, whereby variations in the strength of that portion of the field in the region exterior to the housing are sensed by the electrically conductive coil means;

the magnetic field generating means including first and second means for generating first and second opposing magnetic fields, the first magnetic field extending from the first pole of the first field generating means through an upper portion of the internal magnetic path through the coil means and to the other pole of the first field generating means, the second magnetic field extending from a first pole of the second field generating means along the exterior region through a lower portion of the internal magnetic path and through the coil means to the other pole of the second field generating means.

2. Apparatus as in claim 1 wherein the plurality of magnetic regions is disposed in a circle centered about the axis of rotation of the member.

3. Apparatus as in claim 2 wherein each of the at least one sensing means is positioned at a selected radius from the axis corresponding to the radius of the plurality of magnetic regions.

4. Apparatus as in claim 3 wherein each of the plurality of magnetic regions is equally spaced from each adjacent one of the plurality of magnetic regions.

5. Apparatus as in claim 1 wherein the drive means is an electric motor.

6. Apparatus as in claim 1 wherein the member is flexible.

7. Apparatus as in claim 6 wherein the at least one sensing means comprises eight sensing means.

8. Apparatus as in claim 7 wherein four of the sensing means are disposed above the member and four are disposed below the member.

9. Apparatus as in claim 8 wherein each of the four sensing means beneath the member are positioned directly beneath the four sensing means positioned above the member.

10. Apparatus as in claim 9 wherein each of the four sensing means above the member are disposed in a plane parallel to the member and substantially 90° apart.

11. Apparatus as in claim 1 wherein the member has a substantially flat upper surface.

12. Apparatus as in claim 11 wherein each of the plurality of magnetic regions is aligned to have the axis between its north and south poles perpendicular to the substantially flat upper surface of the member.

13. Apparatus as in claim 1 wherein the magnetic field generating means comprises a pair of permanent magnets arranged with common poles mutually opposed.

14. Apparatus as in claim 1 wherein the magnetic field generating means comprises paired mutually opposed electromagnets.

* * * * *